United States Patent Office 2,955,916
Patented Oct. 11, 1960

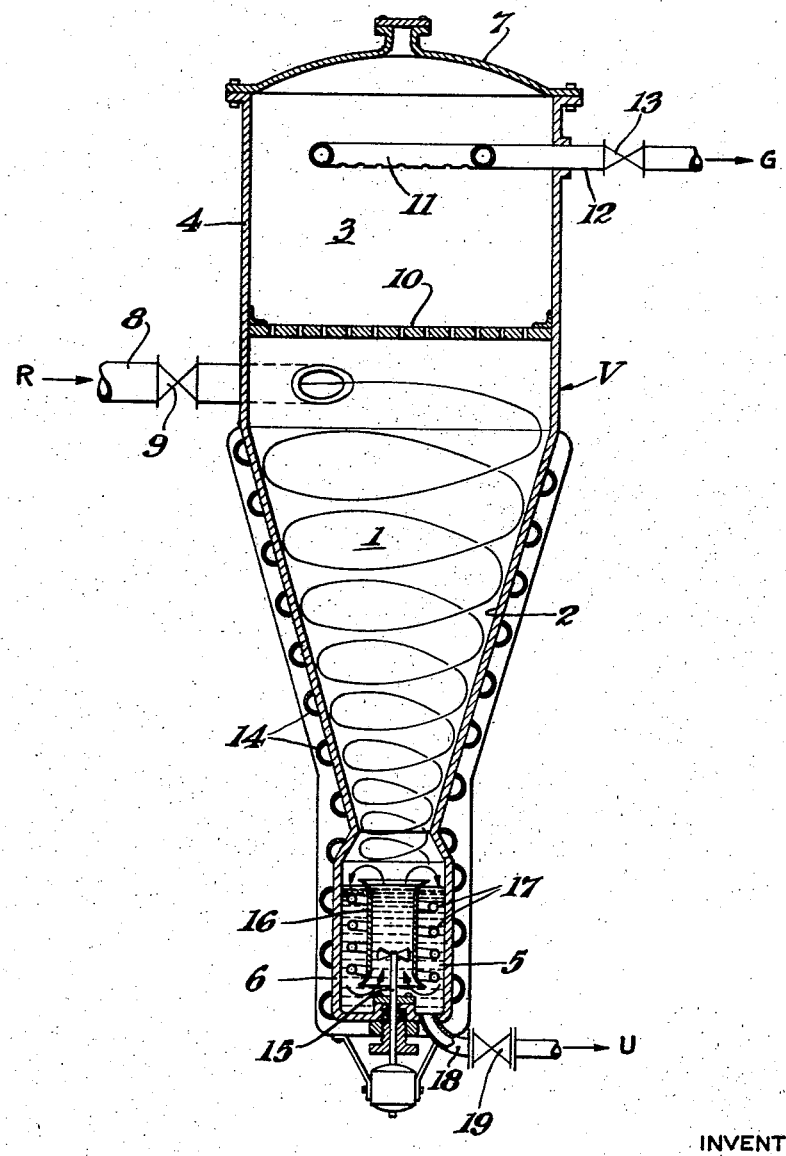

2,955,916

METHOD OF PRODUCING CARBON DIOXIDE AND AMMONIA FROM INTERMEDIATE REACTION PRODUCTS IN THE SYNTHESIS OF UREA

August Guyer, Zurich, Ernst Hess, Neuewelt, Fritz Marti, Basel, and Ernst Peterhans and Werner Zollinger, Visp, Switzerland, assignors to Lonza Electric and Chemical Works Ltd., Basel, Switzerland, a corporation of Switzerland Filed Nov. 19, 1956, Ser. No. 622,729

Claims priority, application Switzerland Nov. 21, 1955

6 Claims. (Cl. 23—150)

This invention relates to improvements in the production of urea from ammonia and carbon dioxide at elevated temperatures and pressures. More particularly the invention relates to a new method and apparatus for the treatment of the urea-containing effluents from a pressure autoclave so as to prevent, to a great extent, the formation of decomposition products such as biuret.

It is well known that when ammonia and carbon dioxide, or compounds thereof such as ammonium carbonate, bicarbonate, carbamate and the like are subjected to high temperature in a closed system, high pressures are generated and urea is formed. For example, urea synthesis has been conducted at pressures of from about 200–350 atmospheres in an autoclave maintained at temperatures of 160°–240° C. During the synthesis reaction the ammonia and carbon dioxide primarily combine exothermically to form ammonium carbamate which at the temperature of the reaction is transformed into urea and water. The resulting reaction mixture contains in addition to urea and water, uncombined residues of the starting materials and the above mentioned intermediate reaction products.

It is also known that the urea contained in the aqueous solution obtained in the synthetic production of urea, decomposes at higher temperatures to form biuret and ammonia. While the biuret content of the concentrated urea solution withdrawn from the high pressure reaction vessel is comparatively small, it increases appreciably when removing the unreacted initial materials ammonia and carbon dioxide, and the major part of the biuret content, which may amount to several percent, is formed during the subsequent recovery of urea from the solution. In industrial applications where urea is used in combination with other chemicals, for instance with formaldehyde in textile finishing and treating solutions, the biuret content in the urea is disturbing because it causes turbidity of the treating solutions and, subsequently, destroys the brilliancy of the textile finish.

It is an object of the present invention to provide a method and apparatus for degassification of the urea solution discharged from a synthesis autoclave.

A further object of the invention is to provide a method and apparatus for degassification of the urea solution discharged from a synthesis autoclave while at the same time promote the decomposition of unconverted intermediate products in such solution into gases starting products whereby they too may be removed from the solution.

A still further object of the invention is to provide a method and apparatus for the removal, in a gaseous form, of all unconverted starting material and decomposed unconverted intermediate products from a urea containing solution while at the same time avoiding undesired decomposition of urea to undesired products including biuret.

Another object of the invention is to provide a method and apparatus for economically removing substantially all of the unreacted ammonia and carbon dioxide and untransformed intermediate products including ammonium carbonate, bicarbonate and carbamate, and some water from the urea containing solution discharged from an autoclave while at the same time avoiding undesired decomposition of urea to biuret.

Yet another object of the invention is to provide a method and apparatus for high temperature degassification of the urea containing solution discharging from a high pressure synthesis system without a decomposition of urea to biuret.

Other objects and advantages of the invention will be apparent from the following discussion.

According to the present invention, the above objects are realized by the discovery that a urea containing solution, such as discharges from a urea synthesis autoclave, can be effectively degassified by forming such solution into a rapidly rotating converging vortex which descends as a relatively thin liquid film within a heated pressure vessel of reduced pressure as compared to the pressure of the synthesis autoclave. The film of solution is very rapidly heated by the wall of the vessel to a temperature just below that which causes decomposition of the urea whereby unreacted ammonia and carbon dioxide and some water are rapidly boiled from the solution. The film of urea solution becomes increasingly concentrated as it approaches the lower terminus of the vortex where-at, by suitable pressure and temperature control, intermediate synthesis products including ammonium carbonate, bicarbonate and carbamate still remaining in the solution are decomposed into gaseous starting materials (ammonia and carbon dioxide). These decomposed gases collect with freed unconverted starting material within the vortex and rise into a gas collector for removal from the degassing apparatus. In practice the swirling vortexial film of urea-containing solution to be treated is rapidly heated to a temperature of about 100° to 180° C. under a pressure of up to 20 atmospheres. The effective length of the vortex depends upon the velocity of the reactants rotating therein and the degree to which the film is heated. The length of the vortexial film may be considerably reduced by providing a chamber at its lower end wherein the final decomposition of the remaining ammonium carbonate, bicarbonate and carbamate may be more rapidly promoted by the presence of a heating coil with suitable agitation of the solution thereabout.

The invention will now be further described by reference to the accompanying drawing in which the figure illustrates in section a preferred embodiment of an apparatus for accomplishing the purposes of the invention.

Referring to the drawing, degassification of a urea-containing solution is accomplished in pressure vessel V comprised of a central zone 1 which is defined by conical wall 2 of downwardly converging configuration, a superimposed gas collection zone 3 defined by cylindrical wall 4 and a lower carbamate decomposing chamber 5 within cylindrical wall 6. The vessel, which is preferably constructed of highly alloyed steel, is provided with a pressure tight closure 7. The urea-containing reaction mixture R from a urea synthesis autoclave (not shown), which is to be degassified, enters degassing zone 1 near the top through pipe 8 and reducing valve 9. Between the degassing zone 1 and gas collection and gas-liquid separation zone 3 there may be provided a flow baffle 10 which may comprise a grating, perforated plate, screen or the like or a cyclone through which separated gases from zone 1 pass to zone 3 before leaving the degassing vessel. The flow baffle or cyclone acts to prevent the entrainment of liquid particles in the gas leaving the collecting zone. A collecting ring 11 likewise may be provided where a baffle is used, such ring having a construction such that liquid particles as may pass through the baffle are substantialy prevented from leaving zone 3. Separated gases G, comprised mainly of ammonia and carbon dioxide enter ring 11 and leave the reaction vessel through pipe 12 and reducing valve 13.

Externally surrounding degassing zone 1 and decomposing chamber 5 is a heating coil 14. Within chamber 5 there is provided a fluid circulation device comprising a motor driven agitator 15 and a cylindrical baffle 16. Surrounding the baffle 16 is a freely supported heating coil 17. The urea solution, freed of unreacted $NH_3$ and $CO_2$ and carbamate and substantially free of undesired biuret, is withdrawn from chamber 5 through pipe 18 and valve 19.

In practicing the present invention in apparatus as described above, a reaction mixture R which may have a temperature of about 200° C. and which contains urea, water, unreacted ammonia and carbon dioxide and intermediate reaction products passes through pipe 8 and reducing valve 9 and is injected tangentially at relatively high velocity into the degassing zone 1 of vessel V. In passing through valve 9 the urea-containing solution becomes cooled to about 120° C. by expansion and partial gassification. The pressure within the degassification zone is maintained at up to about 20 atmospheres (preferably 10 atmospheres gauge) by valve 13. The high velocity reaction mixture stream entering tangentially into zone 1 forms a continuously descending thin film vortex which is rapidly heated by the hot wall 2. A maximum boiling effect to remove gases is attained during a minimum of residence time of the urea-containing mixture in contact with the wall 2. In practice it has been found that the rapidly descending liquid film can be heated to temperatures of from 100° C. to 180° C. without any harmful formation of biuret. Such heating under prior practices would, at the above noted pressures, result in high biuret formation, even where such heating lasted for only short periods. For example, it has been observed that at a temperature of 160° C. more than 1% of decomposition of urea may occur in less than one minute.

The relatively short time heating of the solution film descending in zone 1 at a relatively high temperature causes rapid boiling off of the gaseous constituents which collect in the central region of said zone and pass upwardly into gas collection zone 3. The entrainment of liquids by such gas is inhibited by baffle 10 and collector ring 11. The spirally descending liquid film which has been rapidly and substantially completely degassified in zone 1 is collected in chamber 5 as a liquid pool. By relatively long residence time in chamber 5 the residues of ammonium carbonate, bicarbonate and carbamate are decomposed to ammonia and carbon dioxide. To accomplish this decomposition the collected urea solution in chamber 5 is continuously mixed and circulated in an annular current (see arrows) over submerged heating coil 17. To assure uniform heating of the solution (preferably to a temperature of about 130°–150° C.) a baffle 16 is provided and the liquid level in chamber 5 is maintained at or near the upper edge of the baffle by regulation of outlet valve 19. The ammonia and carbon dioxide resulting from carbamate decomposition rises from chamber 5 and joins the rising gases leaving the liquid film in zone 1.

The use of chamber 5 and its associated mixing device may be dispensed with where the degassing zone is extended by additional converging conical heated surface whereby the carbamate decomposition may be promoted during the last portion of spiral descent of the liquid film within such zone.

While the manner of application of the invention may be varied widely, particularly with regard to the specific reactor design, the following example describes an embodiment of the invention as incorporated in an actual urea plant employing a reactor of a design similar to that shown in the drawing.

EXAMPLE

A urea-containing reaction mixture R, formed by urea synthesis at a temperature of about 200° C. and a pressure of about 300 atmospheres with $NH_3$ and $CO_2$ reactants supplied in a mol ratio of 4.5:1 ($CO_2$ conversion of 77.5%), was introduced to the degassification section of the reactor at about 120° C. The temperature of the descending liquid film within the degassification section was maintained at about 140° C. and the internal pressure was 10 atmospheres. The gaseous effluent from the reactor (exit temperature 140° C. at 10 atmospheres) contained 80% $NH_3$, 17% $CO_2$ and 3% $H_2O$, by weight, while the urea containing liquid effluent (66% urea) contained 6.0% $NH_3$ and 3.5% $CO_2$, by weight. For an average through-put time of about 3 minutes there was less than 0.1% biuret formed.

The effect of varying reactor temperature and pressure conditions during degassification of a urea-containing solution as described above will be more readily noted by reference to the following table.

*Percent by weight of $NH_3$ and $CO_2$ in a 66% urea effluent*

| Liquid Film Temperature, °C. | Absolute Pressure in Reactor, Atmospheres | | | | | | | |
|---|---|---|---|---|---|---|---|---|
| | 9 | | 11 | | 13 | | 15 | |
| | $NH_3$ | $CO_2$ | $NH_3$ | $CO_2$ | $NH_3$ | $CO_2$ | $NH_3$ | $CO_2$ |
| 130 | 7.0 | 4.0 | 7.5 | 5.0 | 8.0 | 6.0 | | |
| 140 | 5.0 | 2.5 | 6.0 | 3.5 | 6.5 | 4.0 | 8.0 | 5.0 |
| 150 | 3.5 | 1.5 | 4.5 | 2.0 | 5.0 | 2.5 | 6.0 | 3.5 |
| 160 | 2.5 | 0.6 | 3.5 | 1.5 | 4.0 | 2.0 | 5.0 | 2.5 |
| 170 | | | | | 3.5 | 1.5 | 4.5 | 2.0 |
| 180 | | | | | | | 4.0 | 2.0 |

Under the above reactor conditions there was always less than 0.1% biuret increase in the urea effluent of the degassifying reactor with respect to the reactor feed solution.

The above example and table clearly show that degassification of a urea-containing mixture from a synthesis operation to practically equilibrium conditions as determined by the working pressure may be easily performed without formation of detrimental quantities of biuret in the degassed urea solution by practice of the present invention. It will be appreciated that various modifications may be made in the invention described above without deviating from the scope thereof as defined in the appended claims.

We claim:

1. In the treatment of a synthesized aqueous urea solution containing unreacted ammonia and carbon dioxide and intermediate synthesis reaction products, an improved method for dissociating said intermediate reaction products into gaseous ammonia and carbon dioxide and evaporatively separating substantially all of the gaseous and unreacted ammonia and carbon dioxide and a portion of the water contained in said solution while substantially suppressing the formation of biuret comprising: passing said synthesized urea solution at an elevated pressure to a degassing zone of downwardly converging configuration maintained at a lower pressure; tangentially introducing said solution into the upper portion of said zone thereby immediately forming a rapidly rotating descending and converging vortical film of said solution, said solution upon introduction into said zone being cooled by expansion and partial gasification; heating said film of solution along its path of descent by indirect heat exchange to a temperature whereby intermediate reaction products dissociate into gaseous ammonia and carbon dioxide and substantially all of said gaseous and unreacted ammonia and carbon dioxide and a portion of the water are evaporatively separated from said solution; simultaneously with said heating step withdrawing the thus separated gases from the upper portion of the degassing zone; and withdrawing a substantially degassed concentrated urea solution from the lower portion of said degassing zone.

2. In the treatment of a synthesized aqueous urea solution containing unreacted ammonia and carbon dioxide and intermediate synthesis reaction products, an improved method for dissociating said intermediate reaction products into gaseous ammonia and carbon dioxide and evaporatively separating substantially all of the gaseous and unreacted ammonia and carbon dioxide and a portion of the water contained in said solution while substantially suppressing the formation of biuret comprising: passing said synthesized urea solution at an elevated pressure to a degassing zone of downwardly converging configuration maintained at a lower pressure; tangentially introducing said solution into the upper portion of said zone thereby immediately forming a rapidly rotating descending and converging vortical film of said solution, said solution upon introduction into said zone being cooled by expansion and partial gasification; heating said film of solution along its path of descent to a temperature of from about 100 to 180° C. by indirect heat exchange whereby intermediate reaction products dissociate into gaseous ammonia and carbon dioxide and substantially all of said gaseous and unreacted ammonia and carbon dioxide and a portion of the water are evaporatively separated from said solution; simultaneously with said heating step withdrawing the thus separated gases from the upper portion of the degassing zone and passing said separated gases to a gas-liquid separation zone which is in restricted communication with said degassing zone whereby entrained liquid particles in said separated gases are substantially disengaged therefrom; withdrawing said separated gases from said gas-liquid separation zone; and withdrawing a substantially degassed concentrated urea solution from the lower portion of said zone.

3. In the treatment of a synthesized aqueous urea solution containing unreacted ammonia and carbon dioxide and intermediate synthesis reaction products, an improved method for dissociating said intermediate reaction products into gaseous ammonia and carbon dioxide and evaporatively separating substantially all of the gaseous and unreacted ammonia and carbon dioxide and a portion of the water contained in said solution while substantially suppressing the formation of biuret comprising: passing said synthesized urea solution at an elevated pressure to a degassing zone of downwardly converging configuration maintained at a pressure up to about 20 atmospheres; tangentially introducing said solution into the upper portion of said zone thereby immediately forming a rapidly rotating descending and converging vortical film of said solution, said solution upon introduction into said zone being cooled by expansion and partial gasification; heating said film of solution along its path of descent to a temperature of from about 100 to 180° C. by indirect heat exchange whereby intermediate reaction products dissociate into gaseous ammonia and carbon dioxide and substantially all of said gaseous and unreacted ammonia and carbon dioxide and a portion of the water are evaporatively separated from said solution; simultaneously with said heating step withdrawing the thus separated gases from the upper portion of the degassing zone and passing said separated gases to a gas-liquid separation zone which is in restricted communication with said degassing zone whereby entrained liquid particles in said separated gases are substantially disengaged therefrom; withdrawing said separated gases from said gas-liquid separation zone; and withdrawing a substantially degassed concentrated urea solution from the lower portion of said zone.

4. In the treatment of a synthesized aqueous urea solution containing unreacted ammonia and carbon dioxide and intermediate synthesis reaction products, an improved method for dissociating said intermediate reaction products into gaseous ammonia and carbon dioxide and evaporatively separating substantially all of said gaseous and unreacted ammonia and carbon dioxide and a portion of the water contained in said solution while substantially suppressing the formation of biuret comprising: passing said synthesized urea solution at an elevated pressure to a degassing zone of downwardly converging configuration maintained at a lower pressure; tangentially introducing said solution into the upper portion of said zone thereby immediately forming a rapidly rotating descending and converging vortical film of said solution, said solution upon introduction into said zone being cooled by expansion and partial gasification; heating said film of solution along its path of descent by indirect heat exchange to a temperature whereby a portion of said intermediate reaction products dissociates into gaseous ammonia and carbon dioxide and substantially all of said gaseous and unreacted ammonia and carbon dioxide and a portion of the water are evaporatively separated from said solution so as to form a substantially degassed urea solution including the remaining portion of said intermediate reaction products; withdrawing said degassed urea solution from the lower portion of said degassing zone and introducing said solution into a dissociation zone; heating said degassed urea solution in said dissociation zone to a temperature whereby said remaining portion of said intermediate reaction products substantially dissociates into ammonia and carbon dioxide, with said ammonia and carbon dioxide dissociation products being evaporatively separated from said solution; simultaneously with said heating steps withdrawing the thus separated gases from the upper portion of said degassing zone; and withdrawing a substantially degassed reactant-free concentrated aqueous urea solution from said dissociation zone.

5. In the treatment of a synthesized aqueous urea solution containing unreacted ammonia and carbon dioxide and intermediate synthesis reaction products, an improved method for dissociating said intermediate reaction products into gaseous ammonia and carbon dioxide and evaporatively separating substantially all of said gaseous and unreacted ammonia and carbon dioxide and a portion of the water contained in said solution while substantially suppressing the formation of biuret comprising: passing said synthesized urea solution at an elevated pressure to a degassing zone of downwardly converging configuration maintained at a lower pressure; tangentially introducing said solution into the upper portion of said zone thereby immediately forming a rapidly rotating descending and converging vortical film of said solution, said solution upon introduction into said zone being cooled by expansion and partial gasification; heating said film of solution along its path of descent to a temperature of from about 100 to 180° C. by indirect heat exchange whereby a portion of said intermediate reaction products dissociates into gaseous ammonia and carbon dioxide and substantially all of said gaseous and unreacted ammonia and carbon dioxide and a portion of the water are evaporatively separated from said solution so as to form a substantially degassed urea solution including the remaining portion of said intermediate reaction products; withdrawing said degassed urea solution from the lower portion of said degassing zone and introducing said solution into a dissociation zone to a temperature whereby said remaining portion of said intermediate reaction products substantially dissociates into ammonia and carbon dioxide, with said ammonia and carbon dioxide dissociation products being evaporatively separated from said solution; simultaneously with said heating steps withdrawing the thus separated gases from the upper portion of said degassing zone and passing said separated gases to a gas-liquid separation zone which is in restricted communication with said degassing zone whereby entrained liquid particles in said separated gases are substantially disengaged therefrom; withdrawing said separated gases from said gas-liquid separation zone; and withdrawing a substantially degassed reactant-free concentrated aqueous urea solution from said dissociation zone.

6. In the treatment of a synthesized aqueous urea solution containing unreacted ammonia and carbon dioxide and intermediate synthesis reaction products, an improved method for dissociating said intermediate reaction products into gaseous ammonia and carbon dioxide and evaporatively separating substantially all of said gaseous and unreacted ammonia and carbon dioxide and a portion of the water contained in said solution while substantially suppressing the formation of biuret comprising: passing said synthesized urea solution at an elevated pressure to a degassing zone of downwardly converging configuration maintained at a pressure up to about 20 atmospheres; tangentially introducing said solution into the upper portion of said zone thereby immediately forming a rapidly rotating descending and converging vortical film of said solution, said solution upon introduction into said zone being cooled by expansion and partial gasification; heating said film of solution along its path of descent to a temperature of from about 100 to 180° C. by indirect heat exchange whereby a portion of said intermediate reaction products dissociates into gaseous ammonia and carbon dioxide and substantially all of said gaseous and unreacted ammonia and carbon dioxide and a portion of the water are evaporatively separated from said solution so as to form a substantially degassed urea solution including the remaining portion of said intermediate reaction products; withdrawing said degassed urea solution from the lower portion of said degassing zone and introducing said solution into a dissociation zone; maintaining by indirect heat exchange the temperature of said degassed urea solution at about 130 to 150° C. in said dissociation zone to dissociate substantially all of said remaining portion of said intermediate reaction products into ammonia and carbon dioxide, with said ammonia and carbon dioxide dissociation products being evaporatively separated from said solution; simultaneously with said heating steps withdrawing the thus separated gases from the upper portion of said degassing zone and passing said separated gases to a gas-liquid separation zone which is in restricted communication with said degassing zone whereby entrained liquid particles in said separated gases are substantially disengaged therefrom; withdrawing said separated gases from said gas-liquid separation zone; and withdrawing a substantially degassed reactant-free concentrated aqueous urea solution from said dissociation zone.

References Cited in the file of this patent

UNITED STATES PATENTS

| | | |
|---|---|---|
| 729,008 | Sulton et al. | May 26, 1903 |
| 1,945,281 | Leithauser | Jan. 30, 1934 |
| 2,267,133 | Porter | Dec. 23, 1941 |
| 2,545,028 | Haldeman | Mar. 13, 1951 |
| 2,655,435 | Ledgett | Oct. 13, 1953 |
| 2,807,574 | Hirano et al. | Sept. 24, 1957 |

FOREIGN PATENTS

| | | |
|---|---|---|
| 500,717 | Germany | Sept. 16, 1927 |
| 465,897 | Great Britain | May 14, 1937 |
| 641,357 | Great Britain | Aug. 9, 1950 |